US006959361B2

United States Patent
Schulz et al.

(10) Patent No.: US 6,959,361 B2
(45) Date of Patent: Oct. 25, 2005

(54) DISTRIBUTED CACHING MECHANISM FOR PENDING MEMORY OPERATIONS WITHIN A MEMORY CONTROLLER

(75) Inventors: Jurgen M. Schulz, Pleasanton, CA (US); David C. Stratman, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 646 days.

(21) Appl. No.: 10/132,643

(22) Filed: Apr. 25, 2002

(65) Prior Publication Data

US 2003/0204684 A1 Oct. 30, 2003

(51) Int. Cl.[7] .............................................. G06F 13/00
(52) U.S. Cl. ...................... 711/120; 709/223; 709/202; 711/154; 711/158; 711/168; 710/240
(58) Field of Search ................................ 711/120, 119, 711/124, 133, 154, 158, 168, 146; 718/102, 103, 104, 105; 710/240, 244; 709/223, 202, 203

(56) References Cited

U.S. PATENT DOCUMENTS

| | | | | |
|---|---|---|---|---|
| 5,802,560 A | * | 9/1998 | Joseph et al. ............... | 711/119 |
| 5,933,849 A | * | 8/1999 | Srbljic et al. ............... | 711/118 |
| 6,341,311 B1 | * | 1/2002 | Smith et al. ................ | 709/226 |
| 6,567,893 B1 | * | 5/2003 | Challenger et al. ......... | 711/118 |
| 2002/0107934 A1 | * | 8/2002 | Lowery et al. ............. | 709/213 |
| 2003/0115243 A1 | * | 6/2003 | Smith ......................... | 709/104 |
| 2003/0159006 A1 | * | 8/2003 | Frank et al. ................ | 711/147 |
| 2004/0111486 A1 | * | 6/2004 | Schuh et al. ............... | 709/214 |
| 2004/0117437 A1 | * | 6/2004 | Frank .......................... | 709/203 |
| 2004/0148336 A1 | * | 7/2004 | Hubbard et al. ............ | 709/202 |
| 2005/0010664 A1 | * | 1/2005 | Hubbard ..................... | 709/224 |

* cited by examiner

Primary Examiner—Hong Kim
(74) Attorney, Agent, or Firm—Park, Vaughan & Fleming LLP

(57) ABSTRACT

One embodiment of the present invention provides a memory controller that contains a distributed cache that stores cache lines for pending memory operations. This memory controller includes an input that receives memory operations that are directed to an address in memory. It also includes a central scheduling unit and multiple agents that operate under control of the central scheduling unit. Upon receiving a current address, a given agent compares the current address with a cache line stored within the given agent. All of the agents compare the current address with their respective cache line in parallel. If the addresses match, the agent reports the result to the rest of the agents in the memory controller, and accesses data within the matching cache line stored within the agent to accomplish the memory operation.

21 Claims, 5 Drawing Sheets

DISTRIBUTED CACHING MECHANISM FOR PENDING MEMORY OPERATIONS WITHIN A MEMORY CONTROLLER

BACKGROUND

1. Field of the Invention

The present invention relates to computer memory systems. More specifically, the present invention relates to an apparatus and a method for implementing a distributed, caching mechanism for pending memory operations within a memory controller.

2. Related Art

To improve performance, many modern computer systems, especially high-end servers, use multiple processors to provide higher throughput. Each of these processors can act independently to provide computational services; however, the processors typically use a common memory to store instructions and data.

In order to avoid the long latencies associated with accessing main memory, each processor stores recently used instructions and data in a local high-speed cache memory. A processor continues to access a cache line until the cache line is no longer required or is required by another processor. When the processor finally relinquishes a cache line, any changes to the cache line are typically written back to main memory.

Since each processor in a multiprocessor system includes its own local cache, these processors can be in competition for data stored at a given address thereby causing an access to main memory each time a different processor requires the data. Accessing main memory in this way can seriously degrade system performance.

What is needed is an apparatus and a method that mitigates the delay involved in frequently storing and retrieving cache lines from the main memory of a multiprocessor system without the problems listed above.

SUMMARY

One embodiment of the present invention provides a memory controller that contains a distributed cache that stores cache lines for pending memory operations. This memory controller includes an input that receives memory operations that are directed to an address in memory. It also includes a central scheduling unit and multiple agents that operate under control of the central scheduling unit. Upon receiving a current address, a given agent compares the current address with the address of a cache line stored within the given agent. All of the agents compare the current address with their respective cache line in parallel. If the addresses match, the agent reports the result to the rest of the agents in the memory controller, and accesses data within the matching cache line stored within the agent to accomplish the memory operation.

In one embodiment of the present invention, the agent includes a queue within each agent that stores pending memory operations that are waiting for a current memory operation involving the current cache line in that agent to complete.

In one embodiment of the present invention, the agent writes data stored within that agent to memory after a last entry in the queue has been processed. After writing the data to memory, the agent is free to be associated with a new cache line.

In one embodiment of the present invention, the memory controller provides status information to the central scheduling unit indicating whether that agent is currently associated with a cache line or is free to be associated with the new cache line.

In one embodiment of the present invention, an agent can be associated with the current cache line address when the given agent is free to be associated with the new cache line.

In one embodiment of the present invention, an agent aborts comparing the address with the current cache line address if another agent reports a match.

In one embodiment of the present invention, the given agent is allocated to the address when the central scheduling unit signals that the given agent is next to be allocated.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Computer system

Figure 1:
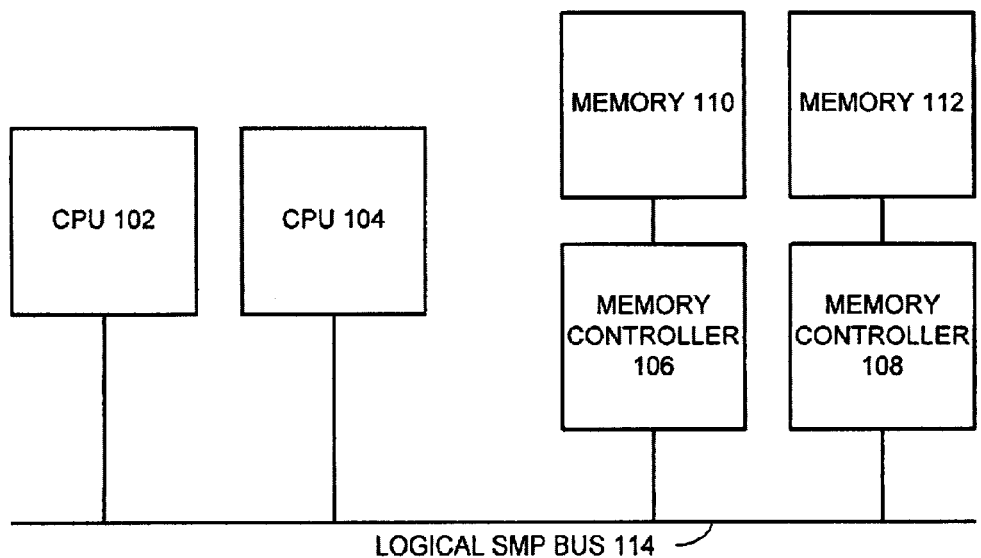
FIG. 1 illustrates a computer system including memory controllers in accordance with an embodiment of the present invention.

FIG. 1 illustrates a computer system including memory controllers in accordance with an embodiment of the present invention. The computer system includes central processing unit (CPU) 102, CPU 104, memory controllers 106 and 108, and memories 110 and 112. CPUs 102 and 104 can include any type of processing unit that can execute computer instructions. The system illustrated in FIG. 1 is a symmetric multiprocessor (SMP) system and can include more CPUs than shown. CPUs 102 and 104 are coupled to logical SMP bus 114. Logical SMP bus 114 can be a bus, a network, or other interconnection that responds as an SMP bus.

Memory controllers 106 and 108 couple memories 110 and 112, respectively, to logical SMP bus 114. Memories 110 and 112 can include any type of memory designed to hold computer instructions and data. Typically, memories 110 and 112 are implemented using dynamic random access memory (DRAM). Each memory controller provides access to and caching for its respective memory from the CPUs on logical SMP bus 114. For example, memory controller 106 provides access to memory 110 and caching for data within memory 110 for CPUs 102 and 104. Note that the system can include more memory controllers with an associated memory than shown.

Memory Controller 106

Figure 2:
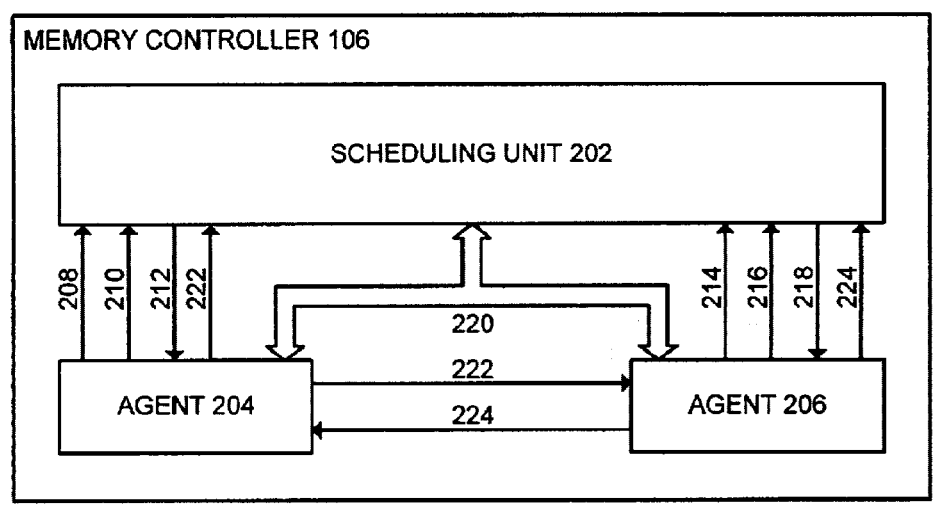
FIG. 2 illustrates memory controller 106 in accordance with an embodiment of the present invention.

FIG. 2 illustrates memory controller 106 in accordance with an embodiment of the present invention. Memory controller 106 is typical of the memory controllers in the system. Memory controller 106 includes scheduling unit 202 and agents 204 and 206. Note that a memory controller includes one scheduling unit and multiple agents. While two agents are illustrated in FIG. 2, a memory controller can generally include any number of agents.

Agents 204 and 206 each are associated with or include storage for one cache line address and one cache line of data. These agents are allocated to a cache line by scheduling unit 202 as is described below.

Agents 204 and 206, and scheduling unit 202 receive addresses on address bus 220. If an agent is currently holding a cache line associated with the address on address bus 220, that agent signals the other agents and scheduling unit 202 that it owns the cache line. For example, if agent 204 is holding the cache line for the address on address bus 220, agent 204 signals agent 206 and scheduling unit 202 on owned out 222. Agent 206 uses owned out 224 to signal agent 204 and scheduling unit 202.

If an agent is free to accept a new cache line, the agent signals scheduling unit 202. For example, if agent 204 is free, agent 204 signals scheduling unit 202 on free 210. If agent 206 is free, agent 206 signals on free 216.

When an address appears on address bus 220 and no agent claims ownership of the cache line, scheduling unit 202 signals a free agent to allocate itself to the cache line. For example, if the address on address bus 220 is not owned and agent 204 is free, scheduling unit 202 can signal agent 204 on allocate 212 to allocate itself to the cache line. Scheduling unit 202 can signal agent 206 on allocate 218 if agent 206 is free.

Each agent queues operations directed to its cache line so that subsequent operations can be directed to other agents. However, if an agent's queue is full, memory controller 106 cannot accept new addresses until the agent processes an operation and has room in its queue. Each agent can signal scheduling unit 202 that its queue is full. For example, agent 204 can signal that its queue is fill on queue full 208 while agent 206 can signal that its queue is full on queue full 214.

When an agent signals that its queue is full, scheduling unit 202 starts filling up a first-in-first-out (FIFO) buffer associated with address bus 220. This FIFO buffer functions as a common queue for the agents. If the FIFO buffer reaches a high-water mark, scheduling unit 202 stops sending new addresses to the FIFO buffer.

Alternatively, if no FIFO buffer exists, when an agent signals that its queue is full, scheduling unit 202 can simply stop new addresses from appearing on address bus 220.

Memory Controller 302

Figure 3:
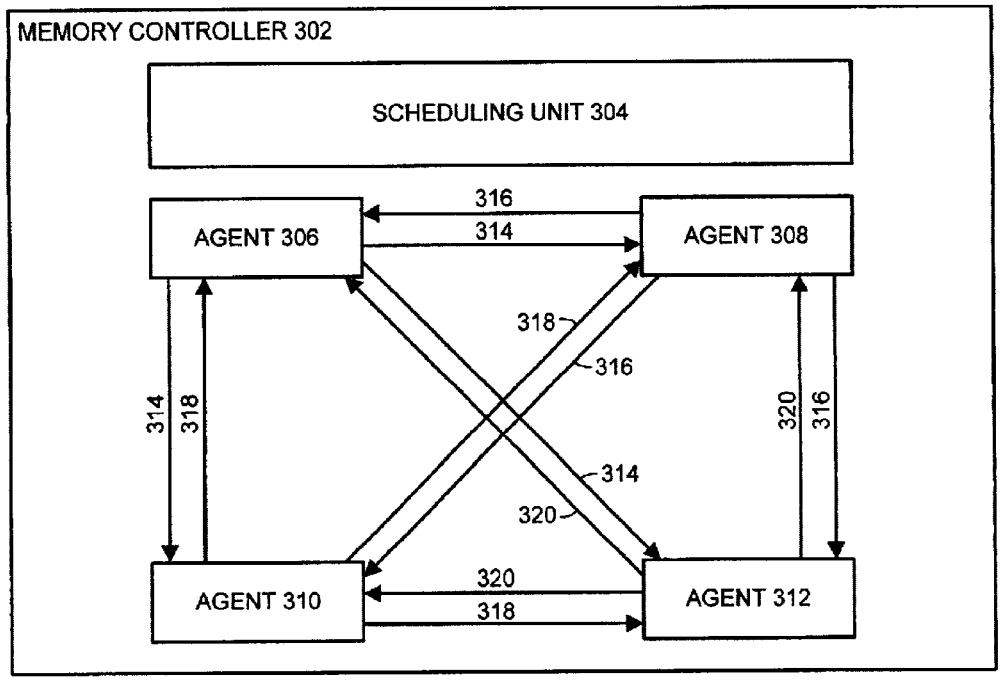
FIG. 3 illustrates memory controller 302 in accordance with an embodiment of the present invention.

FIG. 3 illustrates memory controller 302 in accordance with an embodiment of the present invention. Memory controller 302 includes scheduling unit 304 and agents 306, 308, 310, and 312. FIG. 3 shows how the owned out signals are coupled between the agents; however, the signals coupled to scheduling unit 304 are not shown. Agents 306, 308, 310, and 312 are coupled to scheduling unit 304 as described above in conjunction with FIG. 2. Since each agent can hold one cache line, a memory controller with more agents is more efficient.

Agent 402

Figure 4:
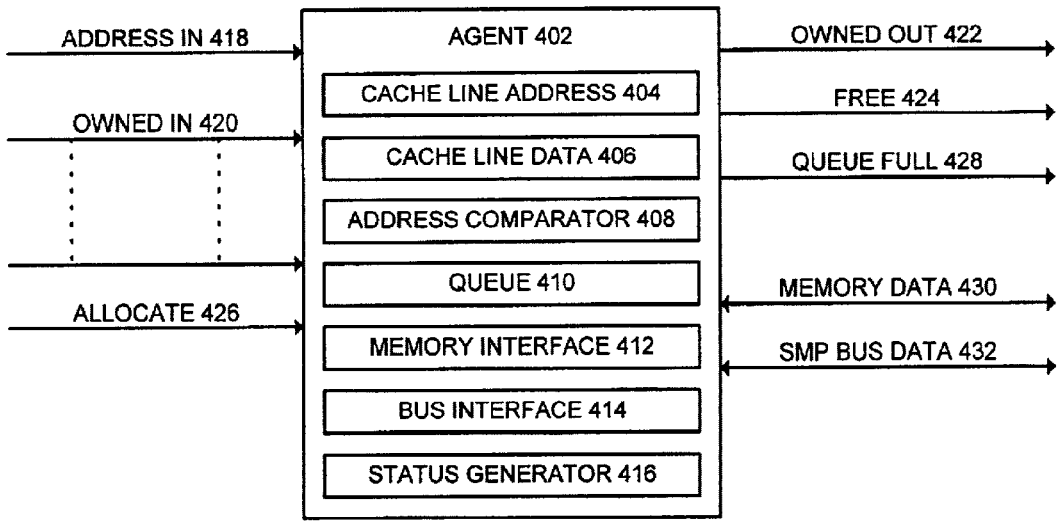
FIG. 4 illustrates agent 402 in accordance with an embodiment of the present invention.

FIG. 4 illustrates agent 402 in accordance with an embodiment of the present invention. Agent 402 is typical of the agents within the memory controller. Agent 402 includes cache line address 404, cache line data 406, address comparator 408, queue 410, memory interface 412, bus interface 414, and status generator 416.

Cache line address 404 is the address of the current cache line stored in agent 402 and is updated each time agent 402 is allocated to a new cache line. Cache line data 406 is the current value associated with cache line address 404. Agent 402 updates cache line data 406 for each memory operation related to the address stored in cache line address 404.

Address comparator 408 compares the incoming address on address in 418 to cache line address 404. If these addresses match, status generator 416 signals the other agents and the scheduling unit on owned out 422, and places the incoming memory operation in queue 410. Queue 410 ensures that the memory operations are properly ordered. If queue 410 becomes full, agent 402 signals the scheduling unit on queue fill 428. The scheduling unlit then stops new addresses until agent 402 becomes available.

Agent 402 executes the memory operations saved in queue 410 on a first-in, fist-out basis. On a first read from memory, memory interface 412 reads the data from memory on memory data 430 and saves the data in cache line data 406. This data is made available to the requesting processor on SMP bus data 432. On subsequent operations saved in queue 410, agent 402 operates on cache line data 406, either updating cache line data 406 during a write operation or providing cache line data 406 to SMP bus data 432 during a read operation. After the last operation saved in queue 410 has been processed, cache line data 406 is written to memory on memory data 430.

Memory interface 412 provides control signals to access memory on memory data 430 and to route data between memory and cache line data 406. Bus interface 414 provides control signals to access the SMP bus on SMP bus data 432 and to route data between the SMP bus and cache line data 406.

In addition to signaling that agent 402 owns the cache line as described above, status generator 416 signals the scheduling unit that agent 402 is free to accept a new cache line on free 424 after the last operation in queue 410 has been processed and cache line data 406 has been written to memory. Note that agent 402 can still respond to an address on address in 418 that matches cache line address 404 while free 424 is set.

The scheduling unit selects the next agent to allocate as described below and signals that agent. For example, if agent 402 has signaled that it is free on free 424, the scheduling unit may signal agent 402 that it is next to allocate on allocate 426. When an address arrives on address in 418 while allocate 426 is set, status agent 402 accepts the address as a new cache line address if none of the other agents set their owned out line. Owned in 420 is coupled to each of the other agents' owned out lines.

Scheduling Unit

Figure 5:
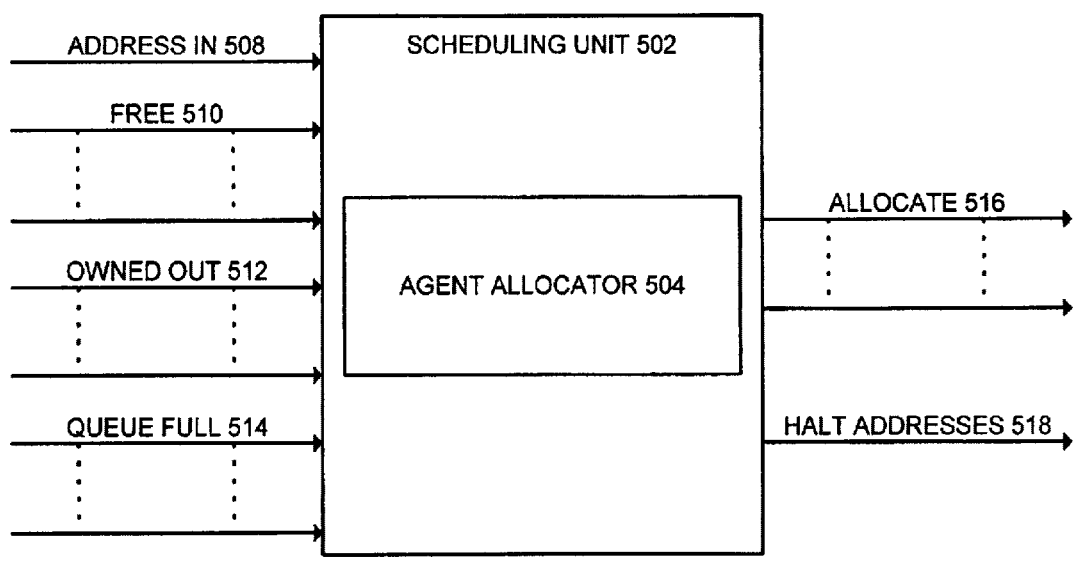
FIG. 5 illustrates scheduling unit 304 in accordance with an embodiment of the present invention.

FIG. 5 illustrates scheduling unit 304 in accordance with an embodiment of the present invention. Scheduling unit 304 includes agent allocator 504. In operation, scheduling unit 304 receives address in 508, free 510, owned out 512, and queue full 514. Free 510, owned out 512, and queue full 514 each include a signal line from each agent in the system.

Agent allocator 504 selects one of the agents that is free from free 510 and sends allocate 516 to that agent. Only one allocate signal can be sent on allocate 516 at any given time. Agent allocator 504 can use any suitable algorithm to select the next agent to allocate. For example, agent allocator 504 could use a least recently used algorithm to select the next agent to allocate.

If any agent signals that its queue is full on queue full 514, scheduling unit 304 starts filling up a first-in-first-out (FIFO) buffer that functions as a common queue for the agents. If the FIFO buffer reaches a high-water mark, scheduling unit 304 stops sending new addresses to the FIFO buffer.

Queuing Memory Operations

Figure 6:
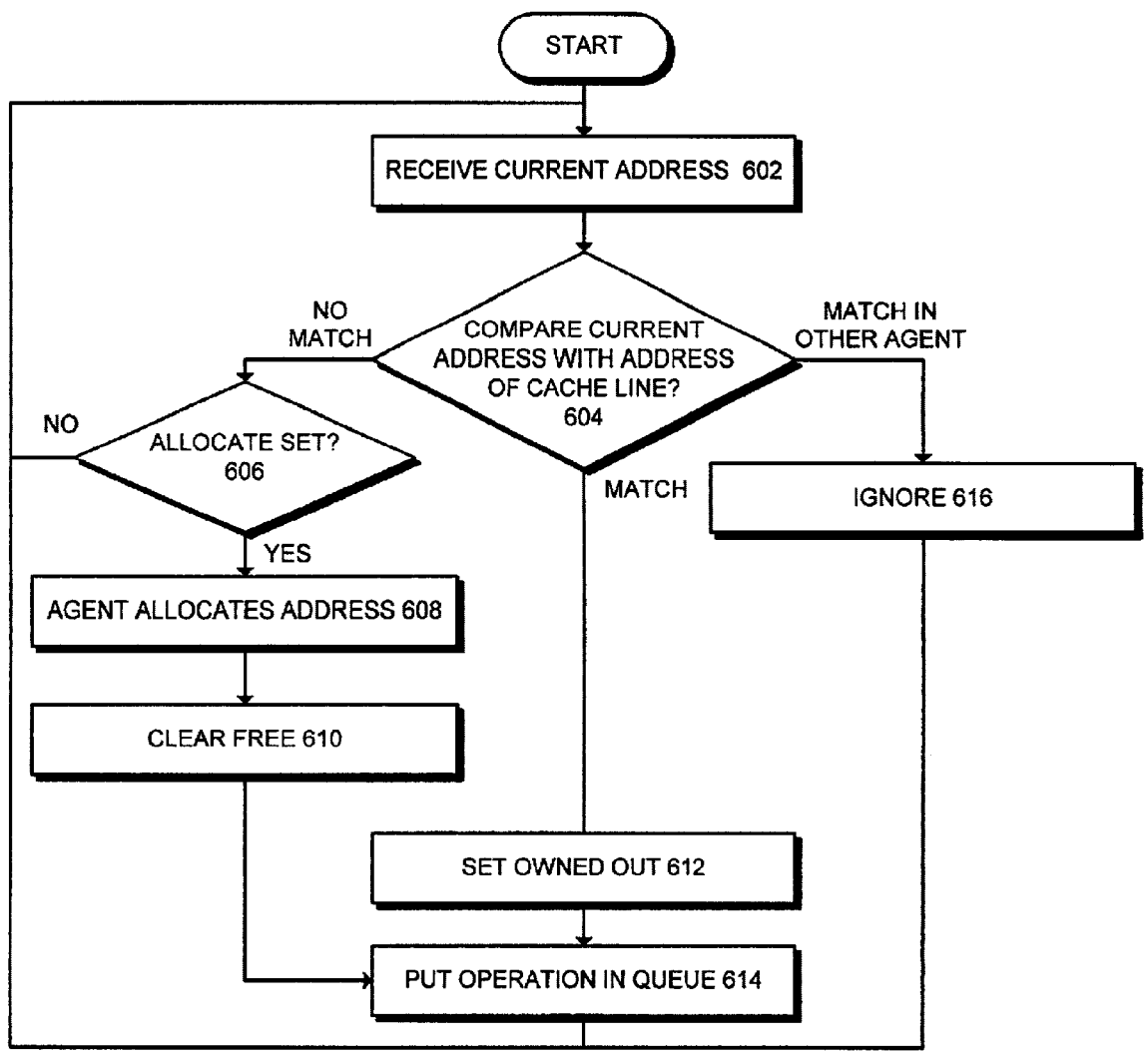
FIG. 6 is a flowchart illustrating the process of queuing memory operations within an agent in accordance with an embodiment of the present invention.

FIG. 6 is a flowchart illustrating the process of queuing memory operations within an agent in accordance with an embodiment of the present invention. The system starts when the memory controller, receives an address from the SMP (operation 602). Next, each agent within the memory controller compares the address with its current cache line address (operation 604).

If no agent sets its owned out line, each agent that is free and has set its free line examines its allocate line (operation 606). Note that only one agent can have its allocate line set at a given time. If an agent's allocate line is set, that agent allocates to the incoming address, and stores the address in it cache line address (operation 608).

After allocating to the address at operation 608 or if the agent has a match at operation 604, the agent places the memory operation in its queue (operation 614).

If the agent receives a match from another agent at operation 604, the agent ignores the operation (operation 616). After ignoring the operation at operation 616, putting the operation in the queue at operation 614, or if the agent's allocate is not set at operation 606, control returns to operation 602 to receive a new memory address.

Processing Operations in the Queue

Figure 7:
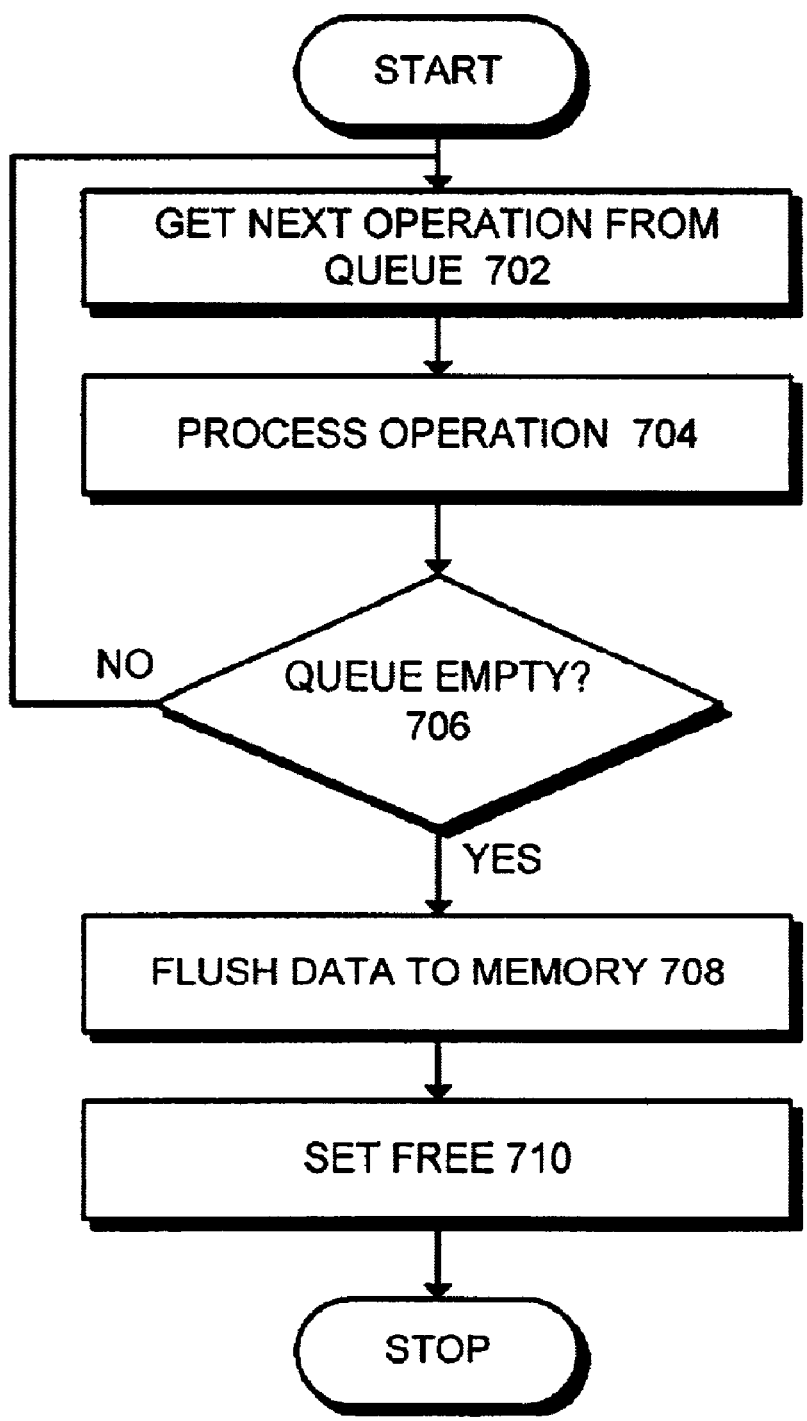
FIG. 7 is a flowchart illustrating the process of servicing a queue in accordance with an embodiment of the present invention.

FIG. 7 is a flowchart illustrating the process of servicing a queue in accordance with an embodiment of the present invention. The system starts when an agent gets an operation that is stored in its queue (operation 702). Next, the agent processes the operation (operation 704). The agent then determines if the queue is empty (operation 706). If not, control returns to operation 702 to get the next operation from the queue.

If the queue is empty because all pending memory operations have completed at operation 706, the agent flushes the cache line data to memory (operation 708). Finally, after the data has been flushed to memory, the agent sets free to signal the scheduling unit that the agent is free (operation 710).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A memory controller containing a distributed cache that stores cache lines for pending memory operations, comprising:
   an input mechanism that is configured to receive a memory operation that is directed to a current address in memory;
   a central scheduling unit;
   a plurality of agents under control of the central scheduling unit, wherein a given agent in the plurality of agents is configured to receive the current address;
   a comparison mechanism within the given agent that is configured to compare the current address with an address of a cache line stored within the given agent;
   a reporting mechanism within the given agent that is configured to report to the plurality of agents a result provided by the comparison mechanism; and
   an access mechanism that is configured to access data within the cache line stored within the given agent in order to accomplish the memory operation when the comparison mechanism indicates a match;
   wherein the plurality of agents compare the current address with their respective cache line addresses in parallel; and
   wherein the given agent holds the cache line while memory operations are pending for the cache line.

2. The memory controller of claim 1, further comprising a queue within the given agent that provides storage for pending memory operations that are waiting for memory operations directed to the cache line stored within the given agent to complete.

3. The memory controller of claim 2, further comprising a memory write mechanism that is configured to write the cache line stored within the given agent to memory after a last entry in the queue has been processed, wherein the given agent is free to be associated with a new cache line when writing is complete.

4. The memory controller of claim 3, further comprising a status mechanism within the given agent to provide status information to the central scheduling unit indicating whether the given agent is currently associated with the cache line or is free to be associated with the new cache line.

5. The memory controller of claim 4, wherein the given agent can respond to the address matching the cache line when the given agent is free to be associated with the new cache line.

6. The memory controller of claim 1, wherein the comparison mechanism is further configured to abort comparing the address with the cache line if another agent reports a match.

7. The memory controller of claim 1, further comprising an allocating unit within the given agent that is configured to allocate the given agent to the address when the central scheduling unit signals that the given agent is next to be allocated.

8. A method that facilitates distributed caching within a memory controller, the method comprising:
   receiving at a given agent in a plurality of agents a memory operation that is directed to a current address in memory;
   comparing the current address with an address of a cache line stored within the given agent;
   reporting to the plurality of agents a result of comparing the address; and
   if the comparison indicates a match, accessing data within the cache line stored within the given agent in order to accomplish the memory operation;

wherein the plurality of agents compare the current address with the address of their respective cache lines in parallel; and wherein the given agent holds the cache line while memory operations are pending for the cache line.

9. The method of claim 8, further comprising queuing within the given agent a plurality of pending memory operations that are waiting for a memory operation involving the cache line to complete.

10. The method of claim 9, further comprising writing data stored within the given agent to memory after a last entry in a queue within the given agent has been processed, wherein the given agent is free to be associated with a new cache line when writing is complete.

11. The method of claim 10, further comprising providing status information to a central scheduling unit indicating whether the given agent is currently associated with the cache line or is free to be associated with the new cache line.

12. The method of claim 11, wherein the given agent can respond to the address matching the cache line when the given agent is free to be associated with the new cache line.

13. The method of claim 8, further comprising aborting comparing the address with the cache line if another agent reports a match.

14. The method of claim 8, further comprising allocating the given agent to the address when a central scheduling unit signals that the given agent is next to be allocated.

15. An integrated circuit that includes a distributed cache, comprising:
   an input mechanism that is configured to receive a memory operation that is directed to a current address in memory;
   a central scheduling unit;
   a plurality of agents under control of the central scheduling unit, wherein a given agent in the plurality of agents is configured to receive the current address;
   a comparison mechanism within the given agent that is configured to compare the current address with an address to a cache line stored within the given agent;
   a reporting mechanism within the given agent that is configured to report to the plurality of agents a result provided by the comparison mechanism; and
   an access mechanism that is configured to access the cache line stored within the given agent in order to accomplish the memory operation when the comparison mechanism indicates a match;
   wherein the plurality of agents compare the current address with addresses of their respective cache lines in parallel; and
   wherein the given agent holds data within the cache line while memory operations are pending for the cache line.

16. The integrated circuit of claim 15, further comprising a queue within the given agent that provides storage for pending memory operations that are waiting for a memory operation involving the cache line to complete.

17. The integrated circuit of claim 16, further comprising a memory write mechanism that is configured to write data stored within the given agent to memory after a last entry in the queue has been processed, wherein the given agent is free to be associated with a new cache line when writing is complete.

18. The integrated circuit of claim 17, further comprising a status mechanism within the given agent to provide status information to the central scheduling unit indicating whether the given agent is currently associated with the cache line or is free to be associated with the new cache line.

19. The integrated circuit of claim 18, wherein the given agent can respond to the address matching the cache line when the given agent is free to be associated with the new cache line.

20. The integrated circuit of claim 15, wherein the comparison mechanism is further configured to abort comparing the address with the cache line if another agent reports a match.

21. The integrated circuit of claim 15, further comprising an allocating unit within the given agent that is configured to allocate the given agent to the address when the central scheduling unit signals that the given agent is next to be allocated.

* * * * *